United States Patent
Lynch et al.

(10) Patent No.: US 8,539,111 B2
(45) Date of Patent: Sep. 17, 2013

(54) PORT SWITCH

(75) Inventors: John C. Lynch, Belleville (CA); Marc Saunders, Belleville (CA); Brian Pick, Foxboro (CA)

(73) Assignee: Avaya Inc., Basking Ridge, NJ (US)

( * ) Notice: Subject to any disclaimer, the term of this patent is extended or adjusted under 35 U.S.C. 154(b) by 769 days.

(21) Appl. No.: 10/454,190

(22) Filed: Jun. 3, 2003

(65) Prior Publication Data

US 2003/0200341 A1 Oct. 23, 2003

Related U.S. Application Data

(63) Continuation of application No. 09/475,542, filed on Dec. 30, 1999, now Pat. No. 6,598,088.

(51) Int. Cl.
*G06F 15/173* (2006.01)
*H04L 29/06* (2006.01)

(52) U.S. Cl.
USPC ........... 709/250; 709/213; 709/225; 709/238; 709/245; 370/351; 370/362; 370/389; 370/395.31; 710/29

(58) Field of Classification Search
USPC ................ 709/203, 217–219, 250, 245, 238, 709/225, 213; 710/29; 370/310, 351, 362, 370/389, 395.31
See application file for complete search history.

(56) References Cited

U.S. PATENT DOCUMENTS

| | | | |
|---|---|---|---|
| 5,751,764 A | 5/1998 | Meyer et al. | |
| 5,751,952 A | 5/1998 | Dai et al. | |
| 5,821,875 A * | 10/1998 | Lee et al. | 340/2.21 |
| 5,867,494 A * | 2/1999 | Krishnaswamy et al. | 370/352 |
| 6,012,099 A * | 1/2000 | Chung | 709/249 |
| 6,035,366 A * | 3/2000 | Teich | 710/316 |
| 6,058,429 A * | 5/2000 | Ames et al. | 709/242 |
| 6,070,187 A * | 5/2000 | Subramaniam et al. | 709/220 |
| 6,092,108 A * | 7/2000 | DiPlacido et al. | 709/224 |
| 6,098,157 A * | 8/2000 | Hsu et al. | 711/157 |
| 6,108,345 A * | 8/2000 | Zhang | 370/445 |
| 6,112,241 A * | 8/2000 | Abdelnour et al. | 709/224 |
| 6,178,414 B1 * | 1/2001 | Beckmann et al. | 707/3 |
| 6,182,185 B1 * | 1/2001 | Stokes | 710/317 |
| 6,185,520 B1 * | 2/2001 | Brown et al. | 703/25 |
| 6,195,356 B1 * | 2/2001 | Anello et al. | 370/398 |
| 6,212,164 B1 * | 4/2001 | Murakami et al. | 370/230 |
| 6,243,360 B1 * | 6/2001 | Basilico | 370/231 |
| 6,324,613 B1 * | 11/2001 | Aguilar et al. | 710/316 |
| 6,343,326 B2 * | 1/2002 | Acharya et al. | 709/238 |
| 6,385,198 B1 * | 5/2002 | Ofek et al. | 370/389 |
| 6,388,995 B1 * | 5/2002 | Gai et al. | 370/256 |
| 6,400,730 B1 * | 6/2002 | Latif et al. | 370/466 |
| 6,404,767 B1 * | 6/2002 | Depelteau et al. | 370/395.1 |
| 6,421,711 B1 * | 7/2002 | Blumenau et al. | 709/213 |
| 6,438,595 B1 * | 8/2002 | Blumenau et al. | 709/226 |
| 6,453,371 B1 * | 9/2002 | Hampson et al. | 710/37 |
| 6,460,120 B1 * | 10/2002 | Bass et al. | 711/148 |
| 6,463,498 B1 * | 10/2002 | Wakeley et al. | 710/309 |
| 6,487,619 B1 * | 11/2002 | Takagi | 710/105 |
| 6,519,705 B1 * | 2/2003 | Leung | 713/300 |

(Continued)

*Primary Examiner* — Alina N Boutah

(74) *Attorney, Agent, or Firm* — Anderson Gorecki & Rouille LLP

(57) ABSTRACT

A method of processing a frame received at a networked device having a port switch and a general-purpose processor. The method can include receiving frame information at the port switch, determining at least one port for the frame, and directing the received frame information based on the determined port(s).

25 Claims, 5 Drawing Sheets

(56) References Cited

U.S. PATENT DOCUMENTS

| | | | |
|---|---|---|---|
| 6,570,875 B1 * | 5/2003 | Hegde | 370/389 |
| 6,580,715 B1 * | 6/2003 | Bare | 370/396 |
| 6,598,088 B1 * | 7/2003 | Lynch et al. | 709/238 |
| 6,615,306 B1 * | 9/2003 | Ajanovic | 710/305 |
| 6,678,269 B1 * | 1/2004 | Michels et al. | 370/389 |
| 6,678,270 B1 * | 1/2004 | Garfinkel | 370/392 |
| 6,687,247 B1 * | 2/2004 | Wilford et al. | 370/392 |
| 6,697,362 B1 * | 2/2004 | Akella et al. | 370/389 |
| 6,788,704 B1 * | 9/2004 | Lindsay | 370/465 |
| 6,907,036 B1 * | 6/2005 | Malalur | 370/382 |
| 6,912,223 B1 * | 6/2005 | Sloane | 370/401 |
| 6,957,270 B1 * | 10/2005 | Erimli et al. | 709/235 |
| 6,987,763 B2 * | 1/2006 | Rochberger et al. | 370/389 |
| RE39,360 E * | 10/2006 | Aziz et al. | 713/150 |
| 2001/0014097 A1 * | 8/2001 | Beck et al. | 370/401 |
| 2002/0052936 A1 * | 5/2002 | Gai et al. | 709/220 |
| 2003/0198251 A1 * | 10/2003 | Black et al. | 370/462 |
| 2005/0111364 A1 * | 5/2005 | Hipp | 370/230 |

* cited by examiner

PORT SWITCH

CROSS-REFERENCE TO RELATED APPLICATION

This application is a continuation (and claims the benefit of priority under 35 USC §120) of U.S. application Ser. No. 09/475,542, filed Dec. 30, 1999 now U.S. Pat. No. 6,598,088. The disclosure of U.S. application Ser. No. 09/475,542 is considered part of (and is incorporated by reference in) the disclosure of this application.

BACKGROUND OF THE INVENTION

This invention relates to processing incoming network frames.

Networks enable devices to quickly exchange information over great distances. Typically, information travels across a network inside network frames, also known as packets. A network frame contains a destination address (the frame destination) and a source address (the frame source). A network frame reaches its destination by winding its way through different computers in the network. Frames can carry nearly any kind of information including e-mail, Internet Web pages, and even real-time voice and video data.

In devices such as personal computers and set-top boxes, a general-purpose processor (e.g., a CPU) usually handles each incoming frame. As network communication grows in importance (e.g., Internet based applications), these general-purpose processors devote increasing resources to frame handling, sometimes at the expense of other tasks.

SUMMARY OF THE INVENTION

In general, in one aspect, the invention features a method of processing a frame received at a networked device. The networked device includes at least one port switch and at least one general-purpose processor. The method includes receiving frame information transmitted over the network at the port switch, determining, at the port switch, at least one port for the received frame information, and directing the received frame information based on the determined port(s).

Embodiments may include one or more of the following features. Directing may include forwarding at least some of the received information to the general-purpose processor. Directing may include determining one or more dedicated hardware systems (e.g., hardware cards) associated with the determined port(s). Such directing may also include forwarding at least some of the received information to the determined dedicated hardware system(s). The dedicated hardware system(s) can include dedicated hardware for processing video data and/or audio data (e.g., IP telephony data). The directing may include accessing a lookup table associating forwarding information with ports. The lookup table may be modified by the general-purpose processor.

The port may be the frame's destination and/or source port. The frame may be an IP (Internet Protocol) frame. The port may be a TCP (Transmission Control Protocol) port or a UDP (User Datagram Protocol) port.

In general, in another aspect, the invention features a port switch for use in a networked device that also includes at least one general-purpose processor. The port switch includes electronics and instructions for causing the electronics to receive frame information transmitted over the network; determine at least one port for the received frame information; and direct the received frame information based on the determined port(s).

In general, in another aspect, the invention features a networked device (e.g., a computer or set-top box) that includes at least one general-purpose processor, one or more dedicated hardware systems, a network connection for receiving frames from remote networked devices, and a port switch that receives information from the frames received over the network connection. The port switch determines at least one port for at least some of the received frames, and, based on the determined ports, directs some of the frames to the general-purpose processor and directing some of the frames to the dedicated hardware systems.

In general, in another aspect, the invention features a method of processing a frame received at a networked device having more than one general-purpose processor. The method includes receiving frame information transmitted over the network, determining at least one port for the received frame information, and directing the frame information to at least one or more general-purpose processors based on the determine port(s). The general-purpose processors may be configured in a master/slave arrangement or as peers.

Advantages of the invention will become apparent in view of the following description, including the figures, and the claims.

DESCRIPTION OF THE PREFERRED EMBODIMENTS

In many computers and other networked devices, a general-purpose processor such as a CPU (Central Processing Unit) processes incoming network frames. As network applications such as real-time voice and video increase in popularity, general-purpose processors often must dedicate increasing resources to their frame handling duties. A port switch, described below, can reduce the burden of network frame processing on a general-purpose processor by independently handling many functions currently provided by the general-purpose processor.

Figure 1:
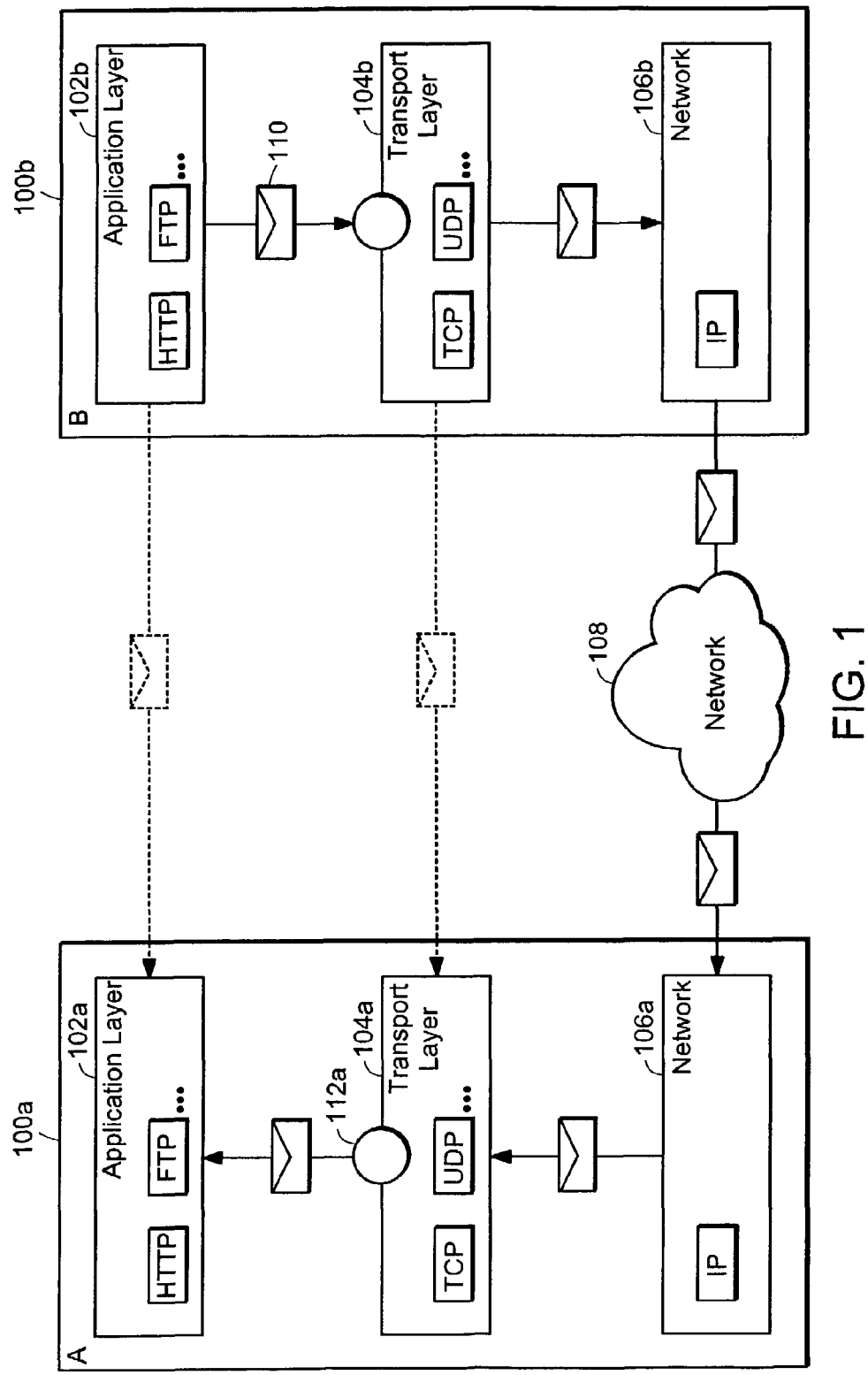
FIG. 1 is a diagram illustrating network layers.

A number of different network models specify the information included in network frames. Often these models divide a device's network duties into a hierarchy of layers. Each layer insulates implementation details from other layers. FIG. 1 shows two networked devices 100a, 100b (e.g., computers, set-top boxes, and so forth) each having layers 102-106 based on the TCP/IP (Transmission Control Protocol/Internet Protocol) model. The TCP/IP model includes network 106, transport 104, and application 102 layers.

The network layer 106 handles the task of physically transmitting information from one networked device to another over the network 108. For example, the network layer 106 can use the destination address of a frame to find a path connecting a frame's source 100b and destination 100a. This is known as "routing."

The transport layer 104 rests atop the network layer 106. When an application in the application layer 102b wants to send a big block or stream of information 110, the transport layer 104b disassembles the information into smaller frames that can be transmitted without overwhelming receiving devices with the overall size. When received at a destination device 100a, the transport layer 104a can reassemble the frames into their original arrangement. Common transport layer protocols include TCP (transmission control protocol), a connection oriented protocol, and UDP (user datagram protocol), a connectionless oriented protocol.

Atop the transport layer 104 rests the application layer 102. The application layer 102 can include application programs and higher level protocols such as HTTP (hypertext transfer protocol) and FTP (File Transfer Protocol). Again, the transport layer 104 can ensure that the application layer sees only the original stream of bytes instead of a piecemeal collection of frames.

To send information 110 from an application (e.g., an e-mail program) on device B 100b to an application on device A 100a, the information is processed by successively lower layers on source device 100b. After reaching the network layer 106b and traveling over the network 108, the information 110 winds its way back up the network layers of the destination device 100a. Although information is actually passed up through successive layers, conceptually, each layer communicates directly with its peer layer on another device. That is, software implementing the HTTP application protocol on device B can be programmed as if it talks directly with the HTTP application on device B. Similarly, elements of the transport layer 104a, conceptually, communicate directly with elements of transport layer 104b with the network layer invisibly taking care of the dirty work of actually getting frames from B to A.

As shown in FIG. 1, the interface between the application 102a and transport 104a layers of a networked device includes one or more ports 112a. Much as an IP address identifies a particular device on a network, a port can identify a particular application or application protocol in the application layer 100a. For example, well-known ports "80" and "21" are commonly associated with the HTTP and FTP application protocols, respectively.

Figure 2:
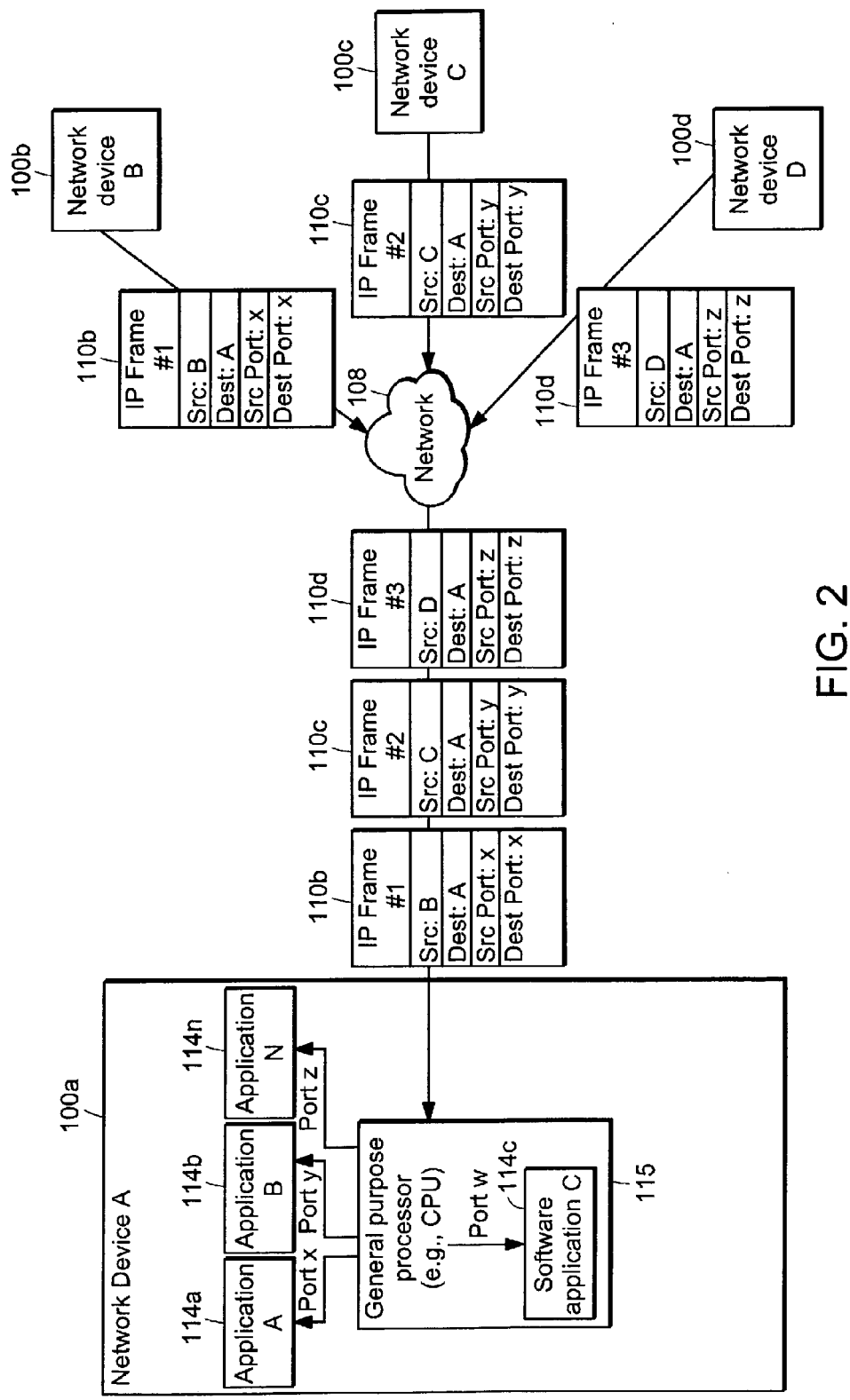
FIG. 2 is a diagram illustrating a general-purpose processor directing frames based on the frames' ports.

FIG. 2 shows several networked devices 100b-100d transmitting IP frames 110b-110d over a network 108 such as the Internet. In addition to the data being transmitted (i.e., the actual e-mail text or voice or video data), each frame 110b-110d includes IP source and destination addresses and source and destination ports. While IP addresses uniquely identify a particular device on the network, the ports can be associated with a particular application or application protocol provided by the destination device.

As shown in FIG. 2, a general-purpose processor 115 handles the task of processing each incoming frame 110b-110d. The term general-purpose processor as used herein describes a processor that concurrently executes software programs in the course of normal operation. For example, an Intel® Pentium® processor found in many personal computers can concurrently execute operating system, network, and other software (e.g., word processing, network administration, and Web viewing or publishing software). Since the device 100a sometimes receives bursts of frames at a rate faster than the processor 115 can handle, the processor 115 typically buffers each received frame in memory for future processing.

When the processor 115 finally has time, the processor 115 determines the destination port of the frame and handles the frame accordingly. For example, frames 110b-110d are designated for delivery to ports x, y, and z, respectively. After the general-purpose processor 115 directs the frames transmitted by network devices B, C, and D to the appropriate ports, applications A, B, and N can access the information included in the frames 110b-110d.

As shown in FIG. 2, an application may be a software application 114c executed by the general-purpose processor 115 (e.g., a Web-browser). Alternatively, an application 114a, 114b, 114n may be implemented in dedicated hardware. For example, application N 114n may correspond to a PC card that includes a DSP (digital signal processor) codec for processing speech data formatted according to RTP (Real-Time Transport Protocol) used in H.323, SIP, or MGCP (Media Gateway Control Protocol) (also known as MEGACO). Likewise, application B 114b may correspond to hardware dedicated to handling network security, for example, by quickly de-encapsulating and decrypting "tunneled" frames. The applications can rely on the general-purpose processor 115 for performing network transport layer services or can perform such services themselves.

While the general-purpose processor 115 can buffer frames to prevent frames from being lost due to processor overload, buffering incoming frames can consume considerable memory. Additionally, periodic bursts of incoming frames can slow an already busy CPU, increasing the amount of time each buffered frame awaits processing. These factors can combine to make the architecture of FIG. 2 a poor match for real-time network applications.

Figure 3:
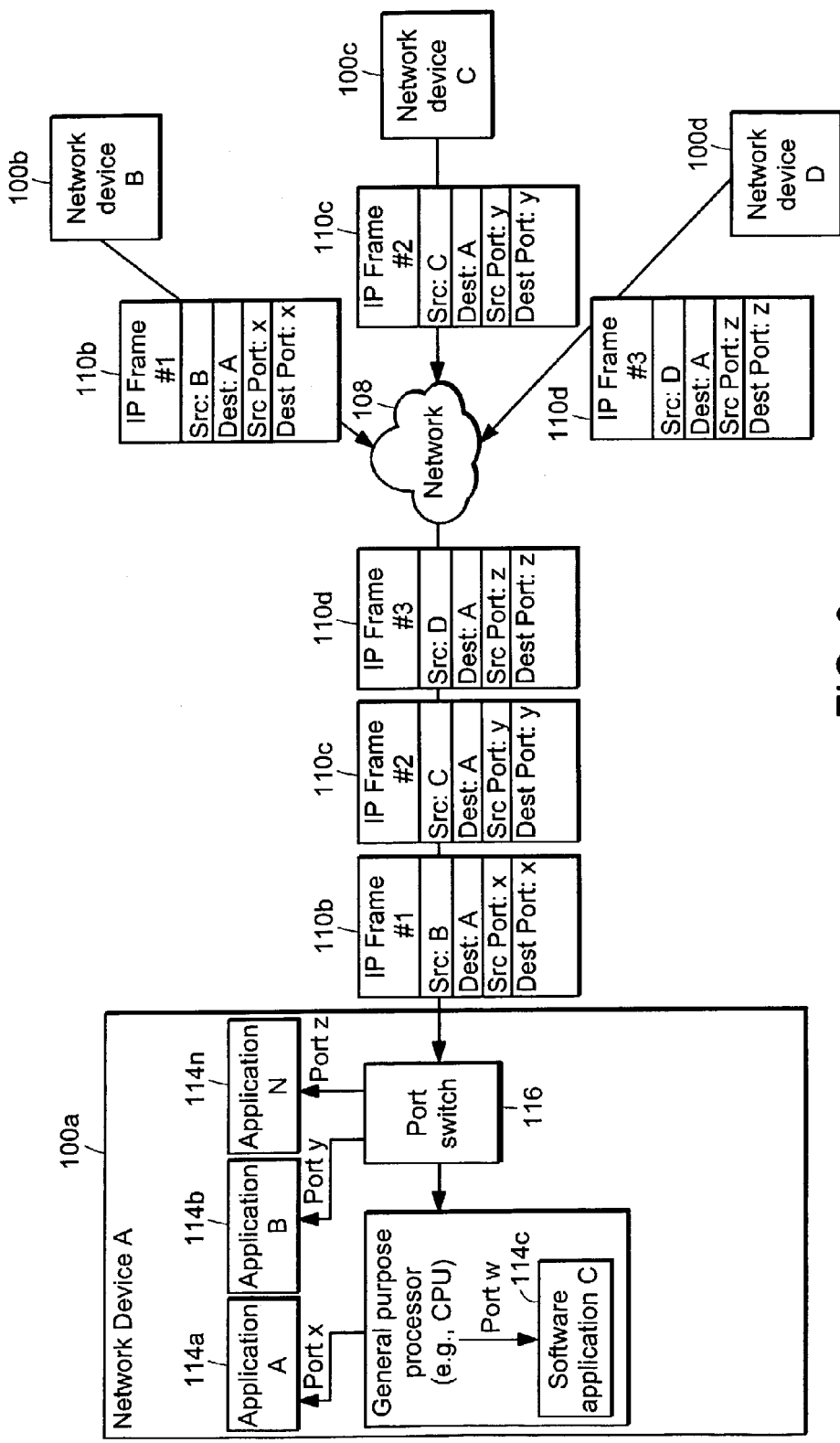
FIG. 3 is a diagram illustrating a port switch directing frames based on a frames' ports.

FIG. 3 shows a networked device 100a that includes both a general-purpose processor 115 and a port switch 116. As shown, the port switch 116 intercepts incoming frames 110b-110d before they reach the general-purpose processor 115, determines the destination and/or source port(s) of the frames, and attempts to direct them to the appropriate dedicated hardware 114a, 114b, 114n based on the determined port(s). For example, as shown in FIG. 3, the port switch 116 can send IP frames #2 110c and #3 110d to applications B and N based on their respective destination ports, without burdening the general-purpose processor 115. Eliminating the general-purpose processor 115 "bottleneck" can speed processing of the incoming network frames 110b-110d and improve the performance of many real-time network applications.

In some embodiments, the port switch 116 can handle each IP frame byte as it arrives. That is, the port switch 116 may ignore the values of other bytes and wait for those designating a port (e.g., bytes 23 and 24 of a TCP/IP frame). Handling frames based on ports can reduce the "store and forward" behavior usually performed on incoming frames. This can reduce the amount of memory needed to buffer incoming frames and can speed frame processing.

As shown in FIG. 3, the port switch 116 may not be able to direct each incoming frame to one of the dedicated hardware systems. For example, the port identified in a frame may require CPU attention (e.g., a frame bound for a software application executed by the CPU). Additionally, the port switch 116 may not have prior knowledge of which dedicated hardware system or application 114a-114n corresponds to a particular port. In such cases, the port switch 116 may forward the frame 110b to the general-purpose processor 115 for handling. However, as shown, even in such cases, the port switch 116 can still siphon off a considerable amount of frame 110b-110d traffic before it reaches the general-purpose processor 115. The reduction in network traffic reaching the general-purpose processor 115 can lighten the burden of network activities on a processor and free the processor to dedicate resources to other tasks.

Figure 4:
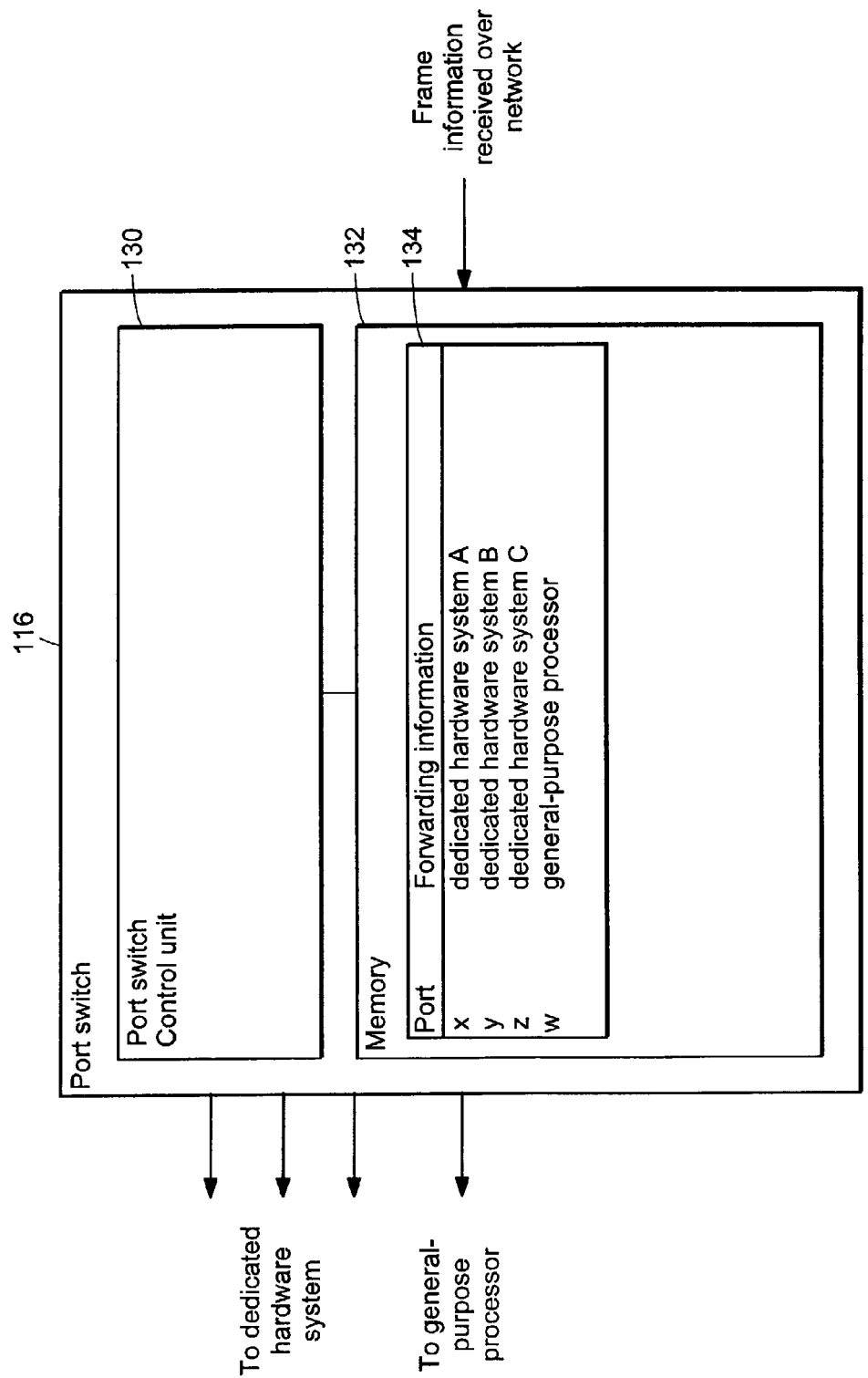
FIG. 4 is a diagram of a port switch.

FIG. 4 shows a port switch 116 that includes a port switch control unit 130 that directs incoming frames based on their destination and/or source ports. To direct a frame, the port switch may maintain a lookup table 134 in memory 132 that associates ports with applications. The lookup table 134 may be user-defined or hard coded. Alternatively, the table 134 may be progressively built, for example, by general-purpose processor 115 as the processor 115 learns how to handle particular destination ports. For example, when an application (e.g., RTP for audio stream or voice over IP) is created, the general-purpose processor 115 can select the port to be used, register the port and application with the port switch, and communicate (e.g., using MGCP) the selected port to the remote device before frame transmission. The general-purpose processor 115 may re-program the port switch 116 each time a new session is started.

As shown, the lookup table 134 can include information identifying dedicated hardware or an application associated with a frame port. The port switch 116 can direct the incoming frame in accordance with this information. For example, if the incoming frame has a destination port associated by the lookup table 134 with a real-time video-conferencing card, the port switch 116 can direct the incoming frame directly to the video-conference hardware without involving the general-purpose processor 115. In different embodiments, such directing may include outputting the frame bytes via a particular output or placing the frame bytes on a shared bus accessed by the appropriate system. For ports not found in the lookup table 134 or ports associated with the general-purpose processor 115, the frame bytes may be forwarded to the general-purpose processor 115 for handling. In different embodiments, the port switch 116 may add, subtract, or extract frame information before passing on the frame.

Figure 5:
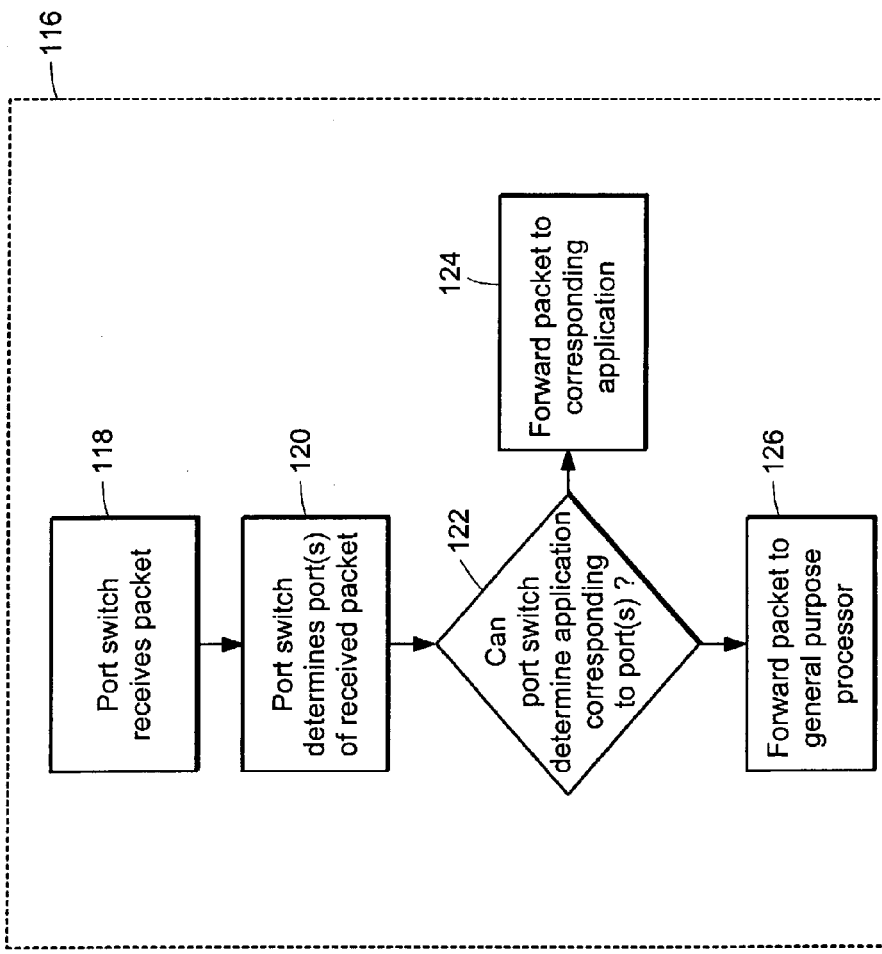
FIG. 5 is a flowchart of a process a port switch may use to direct incoming frames.

As shown in FIG. 5, the port switch 116 can determine 120 the destination and/or source port of each incoming frame as it arrives 118. The port switch 116 can then attempt to determine 122 the application and/or dedicated hardware corresponding to the port, for example, by looking up the port(s) in the lookup table 134. If the port switch 116 determines 124 a dedicated hardware system for handling the frame, the port switch 116 can direct the frame without passing the frame to the general-purpose processor 115.

In some embodiments, the port switch 116 uses only the destination port of a frame. However, in other embodiments the port switch may use only the frame's source port or both the source and destination port. For example, the port switch may use the source/destination port combination to distinguish streams associated with different instances of the same application.

The techniques described here are not limited to any particular hardware or software configuration; the port switch 116 may be implemented using hardware, firmware, and/or software. The port switch may be integrated into motherboards, network cards (e.g., Ethernet cards), modems, and so forth.

The port switch 116 can be used when a single device has more than one assigned IP address. Additionally, the port switch may be advantageously used in systems having more than one general-purpose processor (e.g., master/slave or peer multiprocessor configurations). For example, a multi-processor web-server may include a port switch to load-balance session handling over the processors. In one embodiment, each processor programs the port switch to associate a port destination/port source pair with a particular processor.

The port switch may also be advantageously used to duplicate frames and direct them to different ports. For example, one port may be "active" while another is redundant. The port switch may copy and direct a received frame to both ports. This may be used advantageously in a system that uses a call manager (a.k.a. a gate keeper or call agent). In the event of a failure, a redundant call manager could quickly take over because it has kept a copy of all transactions.

Each program can be coded in a high level procedural or object oriented programming language to communicate with a computer system. However, the programs can be coded in assembly or machine language, if desired. In any case, the language may be a compiled or interpreted language. Each such computer program may be stored on a storage medium (e.g., ROM) or device that is readable by port switch electronics.

Other embodiments are within the scope of the following claims.

The invention claimed is:

1. An apparatus comprising:
  a network device including a network card and a general purpose processor which is not part of the network card, the network card including a port switch comprising:
  memory comprising a port lookup table associating one or more ports with one or more destinations in the network device; and
  a control unit which intercepts a data packet received by the network device from a network before the data packet reaches the general purpose processor, the data packet bound for a final destination in the network device, utilizes the port lookup table to determine the final destination of the packet, and forwards the data packet to the determined destination.

2. The port switch in accordance with claim 1 wherein the at least one port comprises a destination port and a source port.

3. The port switch in accordance with claim 1 wherein the at least one port comprises a UDP (User Datagram Protocol) port.

4. The port switch in accordance with claim 1 wherein the at least one port comprises a TCP (Transmission Control Protocol) port.

5. The port switch in accordance with claim 1 wherein the destination includes a software application.

6. The port switch in accordance with claim 5 wherein the application comprises a dedicated system for processing the forwarded data packet.

7. The port switch in accordance with claim 6 wherein the dedicated system comprises a digital signal processor.

8. The port switch in accordance with claim 1 wherein, prior to forwarding, the port switch modifies data in the intercepted data packet.

9. A method for delivering a data packet to a final destination in a network device comprising:
  receiving the data packet from a network by a network card of the network device, the data packet being bound for a general purpose processor that is not part of the network card;
  intercepting the data packet at a port switch of the network card before the data packet reaches the general purpose processor;
  determining at least one port identified within the received data packet;
  accessing a port lookup table and determining whether the determined at least one port corresponds to a final destination in the network device; and
  in response to determining that the at least one port corresponds to the final destination, forwarding the intercepted data packet to the final destination, and
  in response to determining that the at least one port does not correspond to any final destination, forwarding the intercepted data packet to the general purpose processor.

10. The method in accordance with claim 9 wherein the at least one port comprises a destination port and a source port.

11. The method in accordance with claim 9 wherein the at least one port comprises a UDP (User Datagram Protocol) port.

12. The method in accordance with claim 9 wherein the at least one port comprises a TCP (Transmission Control Protocol) port.

13. The method in accordance with claim 9 wherein the final destination comprises a software application.

14. The method in accordance with claim 13 wherein the application comprises a dedicated system for processing the forwarded data packet.

15. The method in accordance with claim 14 wherein the dedicated system comprises a digital signal processor.

16. The method in accordance with claim 9 further comprising:
    prior to forwarding, modifying data in the received data packet.

17. The method in accordance with claim 9 further comprising:
    initiating execution of a first application;
    registering the first application and an associated port number in the lookup table; and
    communicating the associated port number to a remote device.

18. The method in accordance with claim 17 wherein the data packet comprises Internet Protocol (IP) frame bytes.

19. A network device comprising:
    a general purpose processor on a motherboard; and
    a network card that receives data packets from one or more remote networked device, the network card including:
        a port switch which intercepts received data packets bound for the processor before the data packets reach the processor, the port switch comprising,
            memory comprising a port lookup table associating one or more ports with one or more destinations in the network device, and
            a control unit operable for determining at least one port from the intercepted received data packets, for accessing the port lookup table, and for forwarding the intercepted data packets to a destination associated with the at least one determined port in the port lookup table, wherein the packet is not forwarded beyond the destination.

20. The network device in accordance with claim 19 wherein the at least one port comprises a destination port and a source port.

21. The network device in accordance with claim 19 wherein the at least one port comprises a UDP (User Datagram Protocol) port.

22. The network device in accordance with claim 19 wherein the at least one port comprises a TCP (Transmission Control Protocol) port.

23. The network device in accordance with claim 19 wherein the destination comprises a software application.

24. The device in accordance with claim 23 wherein the application comprises a dedicated system for processing the forwarded data packet.

25. The device in accordance with claim 24 wherein the processor is a general purpose processor and the dedicated system comprises a digital signal processor.

* * * * *